Patented Sept. 15, 1942

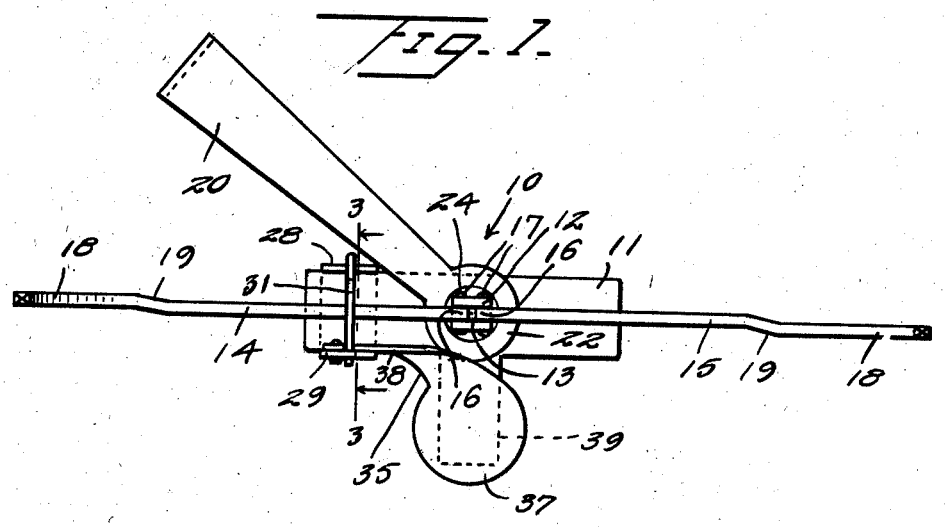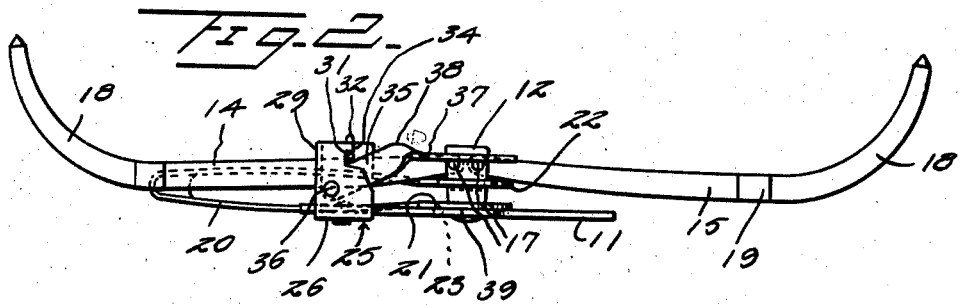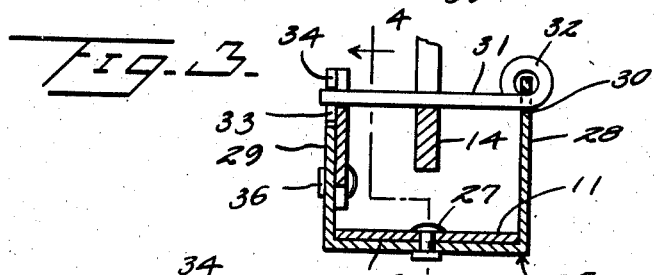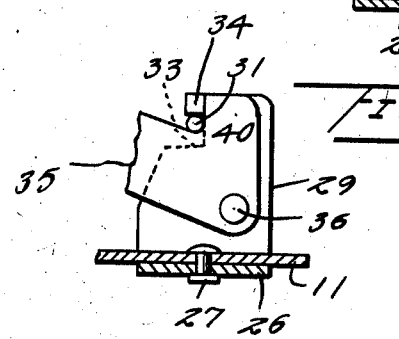

2,296,040

UNITED STATES PATENT OFFICE 2,296,040

TRAP

George R. Lahue, Lemont Furnace, Pa.

Application October 9, 1941, Serial No. 414,343

7 Claims. (Cl. 43—90)

This invention relates to an improved trap especially adapted for use by trappers, and more particularly to a trap which is constructed to kill an animal caught therein quickly and humanely.

Among the primary objects of the invention are: to provide a trap which will be light and compact, yet strong and durable; to provide a trap having a pan or trigger so arranged relatively to the jaws of the trap that when the trap is released by an animal the jaws will either strike the animal's neck or the portion of the body just behind the shoulders and in the region of the vital organs so that in either instance the animal will be killed almost instantly; to provide a trap that will eliminate the danger of an animal escaping after being caught and which can be used for catching mink or muskrat, etc., and which does not have to be set when so used to drown the catch; to provide a trap which does not have to be anchored down except when used for mink or muskrat and in such cases only to prevent the trap from being washed away; to provide a trap which will not readily become clogged, which is very compact so that it can be easily concealed either on dry land or in the water, and which will not freeze to the ground so as to prevent the jaws from releasing.

Other objects and advantages of the invention will hereinafter become more fully apparent from the following description of the drawing, which illustrates a preferred embodiment thereof, and wherein:

Figure 1 is a top plan view showing the trap set,

Figure 2 is a side elevational view of the same,

Figure 3 is an enlarged transverse vertical sectional view taken substantially along the plane of the line 3—3 of Figure 1, and Figure 4 is a fragmentary longitudinal vertical sectional view of a portion of the trap taken substantially along a plane indicated by the line 4—4 of Figure 3.

Referring more particularly to the drawing, wherein like reference characters designate like or corresponding parts throughout the different views, 10 designates generally the trap in its entirety and which includes an elongated substantially flat base 11 forming the base of the trap. A post 12 is secured to the base 11, intermediate of the ends thereof, and projects upwardly therefrom. The post 12 is preferably polygonal shaped in cross section and increases in size from its lower to its upper end, and is provided at its upper end with a slot 13, which opens outwardly thereof and outwardly of opposite sides of the post 12. The slot 13, as seen in Figure 1, is disposed longitudinally of the base 11.

A pair of jaws 14 and 15 have inner corresponding ends 16 disposed in the slot 13 and through each of which a rivet or pivot pin 17 extends. The rivets or pivot pins 17 loosely engage openings, not shown, in the ends 16 for swingably connecting the jaws 14 and 15 to the post 12 and in a manner so that the jaws are arranged to swing in a vertical plane. The jaws 14 and 15 each comprise a bar, the sides of each of which are disposed substantially in vertical planes, when the jaws are set, as seen in Figures 1 and 2. The jaws 14 and 15 are provided with upwardly curved free ends 18 which are offset laterally at 19 relatively to the inner ends of the jaws. As seen in Figure 1, the ends 18 are offset in opposite directions relatively to one another, for a purpose which will hereinafter become apparent.

A spring 20 comprises an elongated strip of resilient metal which is bent upon itself intermediate of its ends and which is provided with enlarged eyelets 21 and 22 at the ends thereof. The eyelet 21 rests on the base 11 and is provided with an opening 23, as seen in dotted lines in Figure 2, which loosely engages around the lower, restricted portion of the post 12. The eyelet 22 is provided with an enlarged opening 24 which loosely engages the upper portion of the post 12 and which is of sufficient size to move upwardly and out of engagement therewith, for a purpose which will hereinafter become apparent. The opening 23 is sufficiently small so that it cannot be moved upwardly and out of engagement with the post 12, but is sufficiently large to permit the spring 20 to be swung on the post 12, for a purpose which will hereinafter become apparent.

Referring particularly to Figures 3 and 4, a U-shaped member 25 has a base portion 26 which is disposed beneath and transversely of the base 11 and which is secured thereto by means of a suitable fastening 27 such as a rivet. The member 25 is connected to the base 11 adjacent one end thereof, and has legs 28 and 29 forming ears which project upwardly on the outer sides of the longitudinal edges of the base 11, and which engage thereagainst to prevent the member 25 from turning relatively to the base 11. The ear 28 is provided at its upper end with an opening 30. A pin or detent 31 is provided with an eye 32 at one end thereof which is loosely connected through the opening 30 for swingably mounting the pin 31 on the ear 28. The ear 29 is provided with a cut-out portion forming a notch 33 which opens in a direction toward the center of the base 11, and which forms a shoulder 34 thereabove. The pin or detent 31 is adapted to extend across the upper edge of the jaw 14, when said jaw is in a set position, and is adapted to have its free end disposed in the notch 33 and bearing against the underside of the shoulder 34 for holding the jaw 14 in a set position to thereby hold the end of the spring 20, having the eye 22, in a compressed position, as seen in Figure 2.

A trigger 35 is pivotally connected adjacent one end thereof to the inner side of the ear 29 by means of a rivet or other fastening 36. The trigger 35 is provided with an enlarged substantially circular opposite end forming a pan 37. The trigger 35 is twisted at 38, intermediate of its ends, so that the pan is disposed substantially at a right angle to the plane of the pivoted end of the trigger, and so that the plane of the pan is substantially parallel to that of the base 11. As seen in Figure 1, the pan 37 is disposed to one side of the jaws 14 and 15 and above and to one side of one longitudinal edge of the base 11. Said edge of the base 11 is provided with an extension 39, intermediate of its ends, which projects laterally therefrom and which is disposed beneath the pan 37 and in substantially the same plane as the base 11, for a purpose which will hereinafter be described. Trigger 35 is provided, at its pivoted end, with an upwardly projecting extension or arm 40, which engages behind the free end of the pin 31, as seen in Figure 4.

The trap 10 is set by pressing downwardly on the upper half of the spring 20 to allow the jaws 14 and 15 to swing downwardly to the positions as seen in Figures 1 and 2. While thus pressing downwardly on the upper half of the spring 20, the pin or detent 31 is swung to a position above and crosswise of the jaw 14 and its free end is positioned in the notch 33 and pressed inwardly thereof and against the forward edge of the extension or arm 40 of the trigger 35 to force said extension rearwardly. This will rock the trigger 35 to elevate the pan 37 to the position, as seen in Figure 2. Pressure on the upper half of the spring 20 is then gradually released to permit the eye 22 to move into engagement with the inner ends of the jaws 14 and 15 for urging said ends upwardly so that the jaw 14 will bear against the intermediate portion of the pin 31 to force the free end thereof upwardly and against the underside of the shoulder 34. The frictional engagement between the free end of the pin 31 and the shoulder 34 will be sufficient to hold the trigger 35 in an elevated position, and the pin 31 by engagement with the jaw 14 will hold it in its position, as seen in Figure 2, to hold the upper half of the spring 20 under tension so that the jaw 15 will be held by gravity in its position of Figure 2, corresponding to the position of the jaw 14. If an animal approaches the set trap 10 on the side thereof from which the pan 37 projects, when the animal's fore feet are positioned to tread on the pan 37, the neck of the animal will be directly above the jaws 14 and 15. Consequently, when the pan 37 is tread upon by the animal it will be depressed to rock the extension 40 forwardly toward the free end of the pin or detent 31 for moving said free end of the pin forwardly and out of engagement with the notch 33 and out of engagement with the shoulder 34 so that the pressure exerted on the jaw 14, by the spring 20, will cause the jaws 14 and 15 to swing upwardly to strike the animal so that its neck will be disposed between the jaws for instantly killing the animal, usually by breaking the neck. If the trap 10 is approached from the opposite side of the jaws 14 and 15, when the fore feet of the animal tread upon the pan 37 the body of the animal directly behind the shoulders will be disposed over the jaws so that the jaws when closing will strike this region, which contains the vital organs, with a sufficiently crushing blow to kill the animal almost instantly.

The extension 39 will obviously prevent the trap 10 from tilting when the pedal 37 is depressed. The intermediate portion of the spring 20 can be swung to the right from its position, as seen in Figure 1, due to the fact that the openings 23 and 24 of its ends 21 and 22 loosely engage the post 12 so that the position of the spring 20 can be adjusted to enable it to be moved out of the way of an obstruction adjacent to which the trap is to be set. The opening 24 of the end 22, as previously stated, is sufficiently large to move out of engagement with the upper end of the post 12 so that when the trap 10 is released said opening can move upwardly and into engagement with the inner portions of the jaws 14 and 15 to securely hold the jaws in closed position. By having the ends 18 offset in opposite directions the upper or inner edges of the jaws 14 and 15 are capable of moving into engagement with one another, when the trap is sprung and consequently when any part of an animal is disposed between the released jaws constant tension will be exerted thereagainst to securely hold and crush the portion of the animal which is engaged by the jaws.

Various modifications and changes are contemplated and may obviously be resorted to, provided they fall within the spirit and scope of the invention as hereinafter defined by the appended claims, as only a preferred embodiment of the invention has been disclosed.

I claim as my invention:

1. A trap comprising a base member, jaws pivotally connected thereto and arranged to swing upwardly to a closed position, spring means disposed to engage and urge the jaws upwardly, a detent pivotally connected to the base at one end of the detent, an ear extending upwardly from the base and having a notch to receive and engage the free end of the detent, said detent being arranged over one of the jaws for holding the spring means retracted, a trigger pivotally connected to the ear and provided with a pan at its free end, and said trigger having an arm arranged to engage the last mentioned end of the detent for moving it out of engagement with the notch, when the pan is depressed, to release the trap.

2. A trap as in claim 1, said jaws being disposed longitudinally of the base, said pan being disposed to one side of the jaws and beyond one longitudinal edge of the base.

3. A trap as in claim 1, the pan portion of said trigger being disposed to one side of the jaws and beyond one longitudinal edge of said base, and said base being provided with an extension disposed beneath the pan and adapted to rest on the supporting surface of the trap to prevent the trap from tilting when the pan is depressed.

4. A trap comprising an elongated substantially flat base, a post fixedly secured to said base and extending upwardly therefrom, elongated jaw members pivotally connected at their inner, adjacent ends to the post and disposed above the base and longitudinally thereof and arranged to swing in a vertical plane, spring means engaging the post, beneath the inner ends of the jaws for urging the outer ends of the jaws upwardly for closing the jaws, laterally spaced ears projecting upwardly from the base, a pin swingably connected to one of said ears, the other ear being provided with a notch for receiving the free end of the pin, said pin extending over one of the jaws for holding said jaw in an open position to hold the spring under tension, a trigger pivotally mounted on said last mentioned ear and having a horizontally disposed pan at its free end, said trigger having an upwardly projecting extension at its pivoted end for engaging the last mentioned, free end of the pin for holding the pan in an elevated position, and said pan being depressible to cause the extension to swing in a direction for engaging and moving the free end of the pin out of engagement with the notch for releasing the jaw held hereby to permit said spring to expand for closing the jaws.

5. A trap as in claim 4, said pan being disposed to one side of the jaws and above and beyond one longitudinal edge of the base.

6. A trap as in claim 4, said pan being disposed to one side of the jaws and above and beyond one longitudinal edge of the base, and said base being provided with a lateral extension disposed beneath the pan and adapted to rest on the supporting surface of the trap to prevent the trap from being tilted when the pan is depressed.

7. A trap as in claim 4, said jaws each comprising an elongated bar, said bars having upwardly curved free ends, and said free ends being offset relatively to the inner ends of the jaws and in opposite directions to one another.

GEORGE R. LAHUE.